United States Patent [19]

Thomas

[11] 4,122,397

[45] Oct. 24, 1978

[54] APPARATUS AND METHOD FOR TIMING RECOVERY FROM A PSEUDO-TERNARY SIGNAL

[75] Inventor: Jay A. Thomas, Mountain View, Calif.

[73] Assignee: GTE Automatic Electric Laboratories Incorporated, Northlake, Ill.

[21] Appl. No.: 769,827

[22] Filed: Feb. 17, 1977

[51] Int. Cl.² ............................................. H03K 9/04
[52] U.S. Cl. .................................. 328/139; 328/140; 328/150; 307/351; 307/358
[58] Field of Search ............... 328/150, 167, 140, 139; 307/351, 358

[56] References Cited

U.S. PATENT DOCUMENTS

| | | | |
|---|---|---|---|
| 2,979,662 | 4/1961 | Farrow | 328/139 |
| 3,037,170 | 5/1962 | Good et al. | 328/150 |
| 3,274,497 | 9/1966 | Zimmerman | 328/150 X |
| 3,346,742 | 10/1967 | Aniano et al. | 307/351 |
| 3,638,037 | 1/1972 | McMurtrie | 307/351 |
| 3,965,370 | 6/1976 | Bates | 307/358 |
| 3,991,379 | 11/1976 | Chadwick et al. | 328/139 |

*Primary Examiner*—John S. Heyman
*Attorney, Agent, or Firm*—Leonard R. Cool

[57] ABSTRACT

A circuit for obtaining clock timing information from an equalized pseudo-ternary signal, such as is exemplified by a signal using the modified duobinary code, includes a level selector in which the signal is sliced at a predetermined amplitude. A slicing level reference circuit provides the threshold voltage for the level selector so that only the upper level portion of the original is obtained for processing. This upper level portion is applied to an amplifier and then to a frequency selection circuit which is tuned to the clock frequency of the original signal.

12 Claims, 11 Drawing Figures

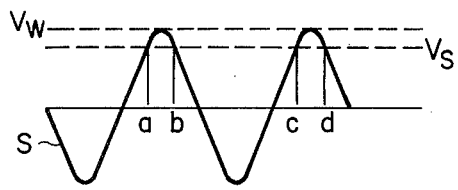
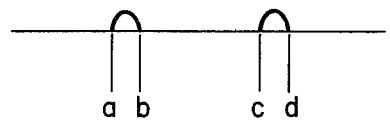
FIG. 3A    FIG. 3B
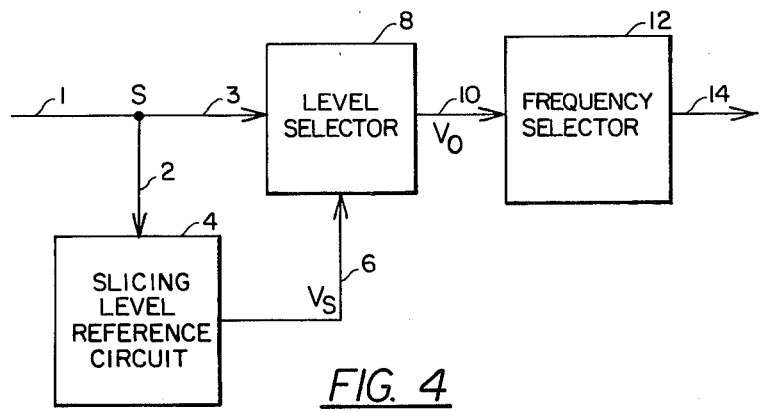
FIG. 4
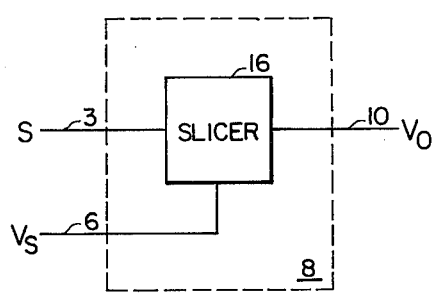
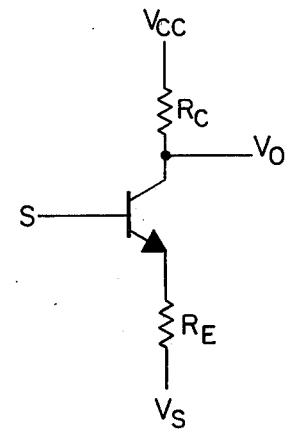
FIG. 6A    FIG. 6B
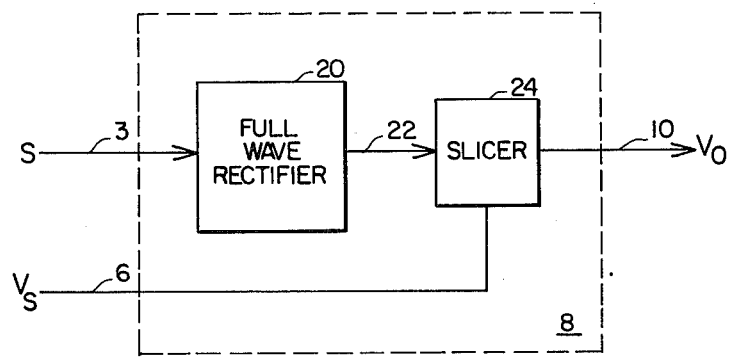
FIG. 7A

APPARATUS AND METHOD FOR TIMING RECOVERY FROM A PSEUDO-TERNARY SIGNAL

BACKGROUND OF INVENTION

1. Field of the Invention

This invention relates to techniques for recovering timing information from a digital signal and more particularly to a technique for recovering timing information from a pseudoternary waveform.

2. Description of the Prior Art

The extensive use of centralized computers for data processing and the rapid growth in the use of pulse code modulation systems for the transmission of voice frequency information has created requirements for the transmission of large volumes of digital information over available communication channels such as telephone lines. While conventional binary transmission techniques may be and have been used in low speed applications, multi-level systems including the duobinary, modified duobinary, quaternary and higher level systems are finding increasing use because of their higher speed capabilities. The modified duobinary data transmission system is described in U.S. Pat. No. 3,457,510.

In the transmission of information by digital signals, a series of time divided equal intervals, called time slots, are employed. In such digital transmission systems, the applied signals are discrete in both time and amplitude, with the time duration of each signal element being substantially equal to one time slot. To recover the transmitted information, the received signal must be sampled in each time slot so as to determine the character of the signal element in each time slot. Because of degradation which occurs during transmission, the received signal is normally equalized to compensate for the most serious distortions of the signal and is amplified to attain an amplitude more nearly like that of the original signal. What is then required is a clock timing signal which permits sampling of each time slot at or near the optimum sampling time so that the discrete amplitudes originally transmitted may be reconstituted.

For binary, bipolar and the baseband duobinary signals as well as for other digital signals of this type, acceptable timing signals may be obtained by non-linear processing (rectification and clipping) which introduces a discrete component at the signaling rate. This is followed by a frequency selection circuit which may be a high Q narrow-band bandpass filter tuned to the timing frequency to extract the desired sinusoidal component, i.e., the discrete component. This sinusoidal timing component is then amplified and limited to produce an approximate square wave at the signaling rate. Generally, the output is then applied to a pulse generator which generates narrow pulses at a particular edge of the square wave. Phase shift correction is often necessary and a phase shifter may be employed in the timing path to adjust the phase of the timing pulse so that the same pulses occur at the proper location in each time slot. A brief discussion of timing recovery is included at pages 656–657 of a text "Transmission Systems For Communications," revised fourth edition, December 1971, Bell Telephone Laboratories, Inc.

A technique for producing a timing signal from a modified duobinary digital signal is disclosed in U.S. Pat. No. 3,707,683. It was noted therein the simple rectification technique disclosed hereinabove did not work well for duobinary signals because of the intersymbol interference and phase structure which caused the resultant timing signal to vanish. To overcome this problem, the technique disclosed employed a plurality of full wave rectifiers. This was necessary to obtain a discrete component at the timing frequency from the modified duobinary signal prior to filtering.

SUMMARY OF THE INVENTION

A circuit arrangement for recovering timing information from an equalized pseudo-ternary waveform such as is exemplified by a modified duobinary signal. The incoming signal is sliced at a predetermined amplitude and only the upper-level portion of the signal is for processing. The upper-level portion is amplified and applied to a frequency selection circuit which is tuned to the clock frequency of the incoming signal.

BRIEF DESCRIPTION OF THE DRAWINGS

FIG. 3A is a single signal waveform diagram illustrating the slicing and peak amplitudes of the waveform for only the positive going pulses.

FIG. 3B is the representation of only the upper-level portion of the positive going pulses which would be obtained by the slicing as illustrated in FIG. 3A.

FIG. 4 is a block diagram of a preferred embodiment of the invention.

FIG. 6A illustrates the use of the slicer for obtaining the upper-level portion of the waveform.

FIG. 6B illustrates a circuit arrangement which may be employed for the slicer 16 of FIG. 6A.

FIG. 7A illustrates the use of a full wave rectifier in conjunction with a slicer in order to obtain the contribution from both the positive and negative going pulses.

DETAILED DESCRIPTION OF THE INVENTION

Figure 1:
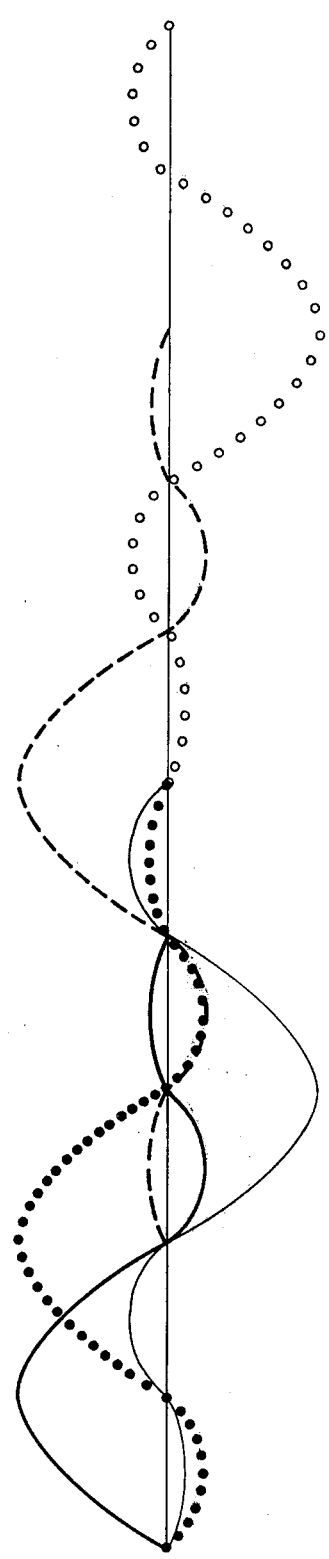
FIG. 1 is a waveform diagram which illustrates the individual pulses and the intersymbol interference resulting from the transmission of a modified duobinary over a band limited channel.

A better understanding of the invention may be obtained by understanding some of the characteristics of the waveform. Referring now to FIG. 1 a real time modified duobinary signal is shown wherein the individual pulses and the inherent intersymbol interference are illustrated.

Figure 2:
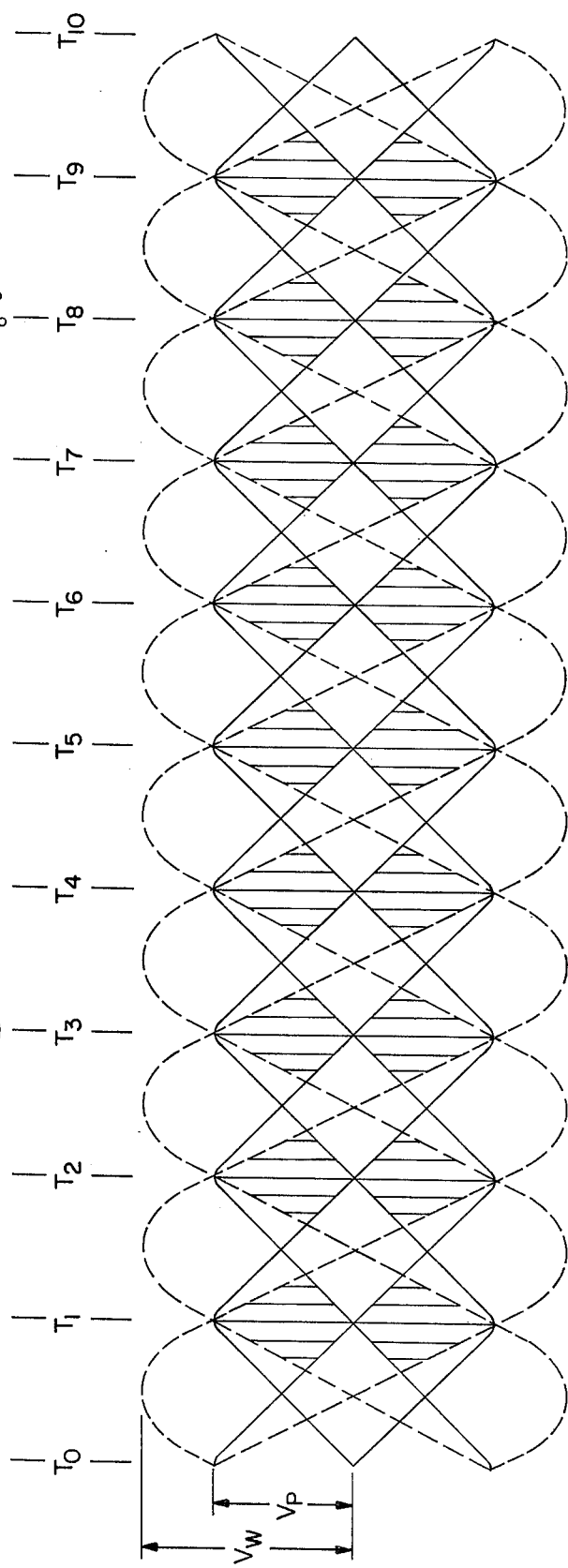
FIG. 2 is an eye pattern waveform representation of a equalized modified duobinary bit stream.

An eye pattern is shown in FIG. 2. When the transmitted digital information is received either at a regenerative repeater or at a terminal it is retimed and either regenerated or decoded. To accomplish this regeneration or decoding, the incoming digital information is first band limited to reduce noise power and equalized to compensate for the length and character of the cable over which it has travelled. The equalized pulses, when superimposed, form a figure that resembles a human eye and is in fact called an eye pattern. Because the presence or absence of a pulse in any given time period is independent of all other pulses, the viewing of all possible pulse shapes in one time period (i.e., the viewing of an eye pattern) is equivalent to the viewing of an infinitely long pulse train. The use of eye patterns in the analysis of digital signal distortion is well known as is discussed in U.S. Pat. No. 3,041,540 and 3,057,957.

Referring now to FIG. 2, an eye pattern representative of a modified duobinary signal is shown. The ampertures representative of the eye are cross-hatched and for this representation the maximum amplitude of the eye is equal to that of an individual signal pulse as illustrated. In practice, the actual amplitude would be somewhat lower and under noisy line conditions could, in fact, become so small as to prevent recovery of the information. With respect to timing recovery another important element shown in the drawings is the peak amplitude of the waveform and its periodicity. The peak amplitude is greater than that of the peak amplitude of a normal individual pulse; and from a study of the waveform peaks it becomes apparent that they contain a frequency component which is equal to the required clock timing frequency.

By careful analysis of the waveform diagram such as in FIG. 2, applicant has discovered a new method of clock extraction. This new technique involves the removal and filtering of the peaks of the modified duobinary signal. This is illustrated most directly as removal of the peaks above the individual pulse amplitudes of the waveform shown in FIG. 2. The removal of the peaks called "slicing" can be accomplished by the use of a circuit which has zero output when the level of the signal, S, is below the threshold voltage $V_s$ and an output which is equal to K (S—$V_s$), when the signal level is greater than $V_s$. The constant K is a linear gain factor. This is shown diagrammatically in FIG. 3A. In this example diagram, $V_s$ is the slicing level and $V_w$ is the peak amplitude of the waveform. FIG. 3B illustrates the upper level portion only, i.e., that which was selected by the slicing process, of the positive going pulses as shown in FIG. 3A. Reverting again to FIG. 2 it should be noted that the threshold voltage at which the slicing occurs is a function of peak height of the eye pattern. Further it is important to note that the slicing voltage, $V_s$, must be between the peak height of the eye pattern, $V_w$, and the peak height of a single individual pulse, $V_p$. The peak height of the eye pattern can be determined by a peak detector which is well known in the art and which has as it's input the real time modified duobinary signal such as is illustrated in FIG. 1.

A preferred embodiment of the invention is illustrated in FIG. 4. The equalized and amplified incoming waveform, S, is applied along path 2 to slicing reference voltage 4 and along path 3 to level selector 8. Reference voltage 4 provides the slicing voltage level $V_s$ on path 6 to level selector 8. The output level selector 8 is the upper level portion of the waveform as is illustrated in FIG. 2 and also as shown in FIG. 3B. It is apparent that both the positive and negative peaks of the eye pattern waveform may be used and, in most instances, this would be preferable since the power of the selected portion of the waveform would be enhanced. The upper-level output is next applied to frequency selector 12 which includes a narrow-band bandpass filter tuned to the clock timing frequency. The output along path 14 is a sinusoidal representation of the clock frequency of the incoming waveform.

Figure 5:
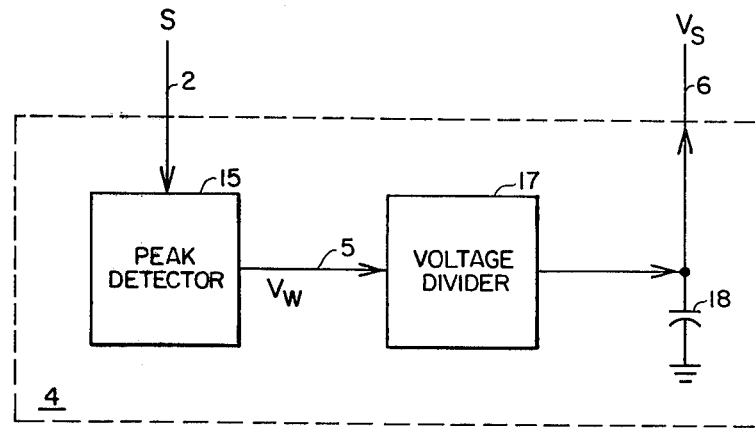
FIG. 5 illustrates the preferred method for obtaining the slicing level reference voltage.

FIG. 5 shows a preferred technique for generating the slicing level reference voltage. The incoming signal on path 2 is applied to peak detector 15. Peak detectors are well known in the art and one such is described in U.S. Pat. No. 3,209,256. The peak voltage $V_w$ is applied via path 5 to voltage divider 17, which may be a standard voltage dividing circuit such as a resistor network. The output of voltage divider 17 is applied to level selector 8 via path 6. A capacitor 18 provides a low impedance circuit to ground thus by-passing transients and minimizing variations in reference voltage when the level selector conducts.

Level selector 8 may consist of a single slicer. A slicing circuit is illustrated in FIG. 6B. In this case, the input waveform is applied at the base of the transistor and is illustrated by the symbol S. The linear gain factor, K, is equal to the ratio of $R_c$ to $R_e$. The upper-level output portion of the signal $V_o$ is obtained from the collector.

Figure 7B:
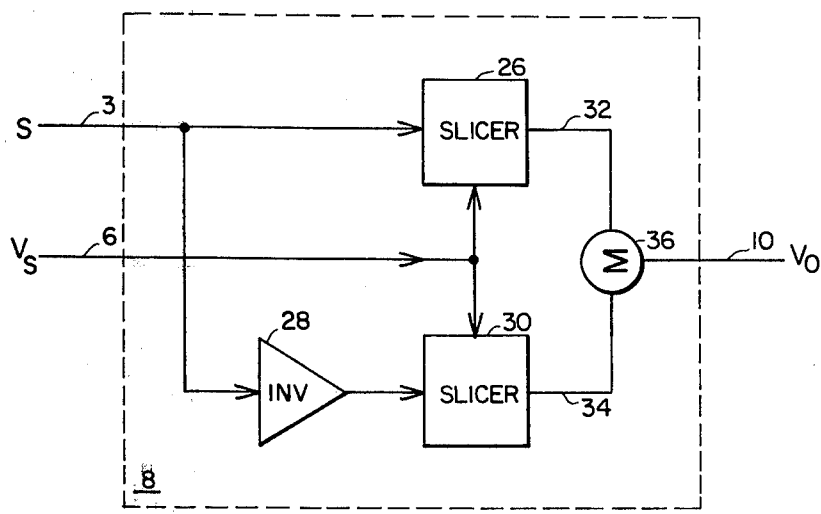
FIG. 7B illustrates the use of an inverter and two separate slicers in conjunction with a summing circuit which also permits the summation of contributions from both positive and negative going pulses.

A different level selecting arrangement is illustrated in FIG. 7A. In this case, both the positive and negative peaks will be used and this is obtained by the use of a full wave rectifier 20 which precedes slicer 24. Otherwise operation of the circuit is the same as that described hereinabove. Another technique for obtaining both positive and negative upper level portions of the signal for processing to obtain the output timing frequency is illustrated in FIG. 7B. In this circuit arrangement two slicers are used 26 and 28 with an inverter connected between the input signal and the input to slicer 30. The slicers, in each case, will provide outputs which are the positive representation of the upper-level portion of the signal applied to it. These output upper-level portions of the signal are applied via paths 32 and 34 to summer 36. Such summing circuits are well known and will not be discussed further herein. The output of the summing circuit is the signal $V_o$ which is applied to the frequency selector 12.

Figure 8:
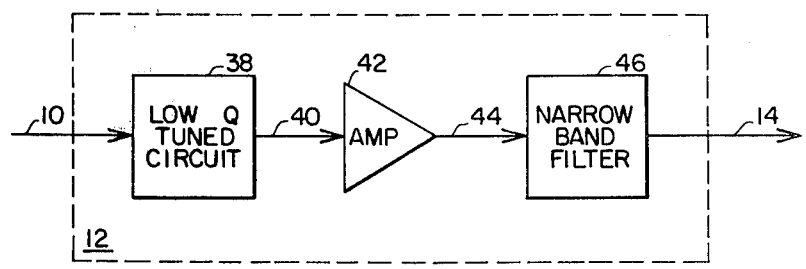
FIG. 8 illustrates the frequency selection and phasing circuit for the preferred embodiment of the invention.

A preferred embodiment of frequency selector 12 is illustrated in FIG. 8. The low Q tuned circuit 38 is an adjustable circuit which may be used to account for any necessary phasing difficulties. Such a circuit will not always be required. The output on path 40 is applied to an amplifier 42 to increase the amplitude of the selected signals and thereby to provide a stronger signal at output 14. The amplifier is optional since it would not be necessary if a strong signal were obtained initially. The output of amplifier 42 is applied via path 44 to a narrow-band filter 46 having bandpass characteristics tuned to the timing frequency desired. The output of filter 46 is a sinusoidal signal at the timing frequency. The output of filter 46 may then be applied to a clock pulse generator, not shown, from which the final clock signals would be derived. This step is well-known in the art and was described hereinabove.

While the invention has been particularly shown and described with reference to a preferred embodiment thereof, it will be understood by those skilled in the art that change in form and detail may be made therein without departing from the spirit and scope of the invention.

What is claimed is:

1. Apparatus for recovering timing information from a pseudo-ternary signal which comprises:
   means for establishing a reference voltage having an amplitude slightly greater than the individual signal pulses;
   level selecting means having an input coupled to receive said reference voltage, having a second input coupled to receive the pseudo-ternary signal, and providing at an output the peaks of the pseudoternary signal which have an amplitude greater than the reference voltage; and frequency selecting means, having an output, having an input connected to the output of said level selector, and providing a timing signal at the output.

2. Apparatus in accordance with claim 1 wherein said means for establishing a reference voltage further comprises:
   a peak detector;
   means for coupling the pseudo-ternary signal to the input of said peak detector; and
   a voltage divider having an input coupled to said peak detector and having an output connected to said level detecting means.

3. Apparatus in accordance with claim 2 wherein said level selecting means further comprises:
   rectifier means;
   means coupling the pseudo-ternary signal to said rectifier means;
   slicing means; and
   means for coupling the output of said rectifier means to said slicing means.

4. The apparatus in accordance with claim 2 wherein said level selecting means further comprises:
   a first slicing means having an output, having one input coupled to receive said pseudo-ternary signal and a second input coupled to the output of said voltage divider;
   inverting means having an input coupled to receive said pseudo-ternary signal;
   a second slicing means having an output, having one input connected to the output of said inverting means and a second input coupled to the output of said voltage divider; and
   summing means having one input connected to the output of said first slicing means and having a second input connected to the output of said second slicing means.

5. The apparatus in accordance with claim 2 wherein said level selecting means further comprises:
   a slicer having one input connected to receive the pseudo-ternary signal and a second input coupled to said level selecting means.

6. Apparatus in accordance with claim 3, wherein said frequency selecting means further comprises:
   a narrow-band bandpass filter having a center frequency substantially equal to the pulse repetition rate of the pseudo-ternary signal.

7. Apparatus in accordance with claim 4 wherein said frequency selecting means further comprises:
   a narrow-band bandpass filter having a center frequency substantially equal to the pulse repetition rate of the pseudo-ternary signal.

8. Apparatus in accordance with claim 5 wherein said frequency selecting means further comprises:
   a narrow-band bandpass filter having a center frequency substantially equal to the pulse repetition rate of the pseudo-ternary signal.

9. Apparatus in accordance with claim 6 wherein said frequency selecting means further comprises:
   a low Q adjustable tuned circuit having an input coupled to the output of said slicing means and having an output; and
   amplifying means having an input connected to the output of said low Q tuned circuit and having an output connected to the input of said bandpass filter.

10. Apparatus in accordance with claim 7 wherein said frequency selecting means further comprises:
    a low Q adjustable tuned circuit having an input coupled to the output of said summing means; and
    amplifying means having an input connected to the output of said low Q tuned circuit and having an output connected to the input of said bandpass filter.

11. Apparatus in accordance with claim 8 wherein said frequency selecting means further comprises:
    a low Q adjustable tuned circuit having an input coupled to the output of said slicing means and having an output; and
    amplifying means having an input connected to the output of said low Q tuned circuit and having an output connected to the input of said bandpass filter.

12. Apparatus for recovering a clock timing information from an equalized pseudo-ternary waveform which comprises:
    reference voltage means having an input coupled to receive the equalized pseudo-ternary waveform and providing at an output a reference voltage having an amplitude which is greater than the peak amplitude of an individual equalized pulse of said pseudo-ternary signal, said amplitude being less than the peak amplitude of the equalized pseudo-ternary waveform;
    level selecting means having one input coupled to receive the equalized pseudo-ternary waveform, a second input coupled to receive the output of said reference voltage means, and providing at its output the upper level amplitude portion of said waveform; and
    frequency selecting means having an output, and having an input coupled to said level selecting means.

* * * * *